March 1, 1932.  S. O. BURG  1,847,380
GROVE AND ORCHARD SUBPULVERIZER DISK
Filed June 10, 1929
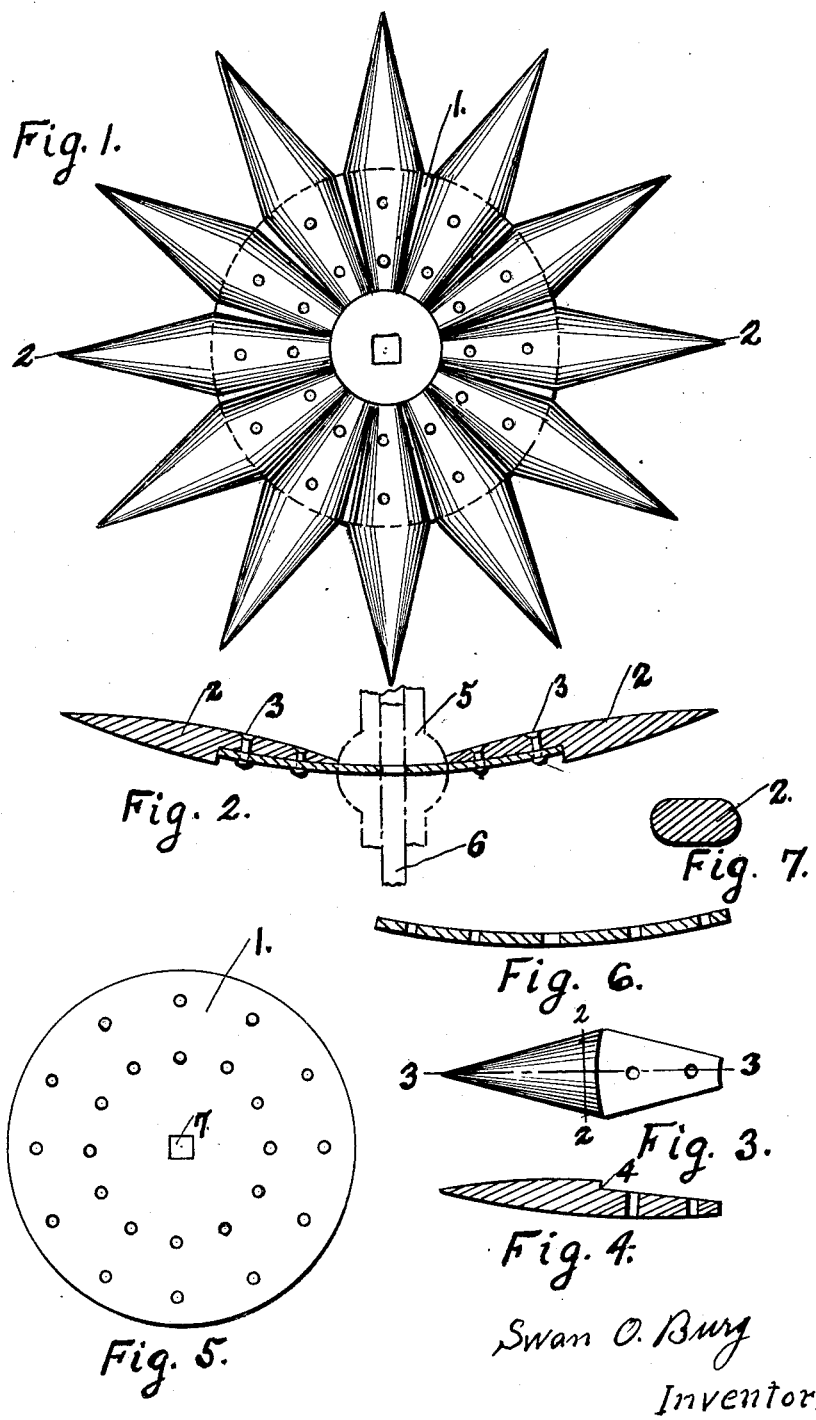

Patented Mar. 1, 1932

1,847,380

UNITED STATES PATENT OFFICE

SWAN O. BURG, OF SEFFNER, FLORIDA

GROVE AND ORCHARD SUBPULVERIZER DISK

Application filed June 10, 1929. Serial No. 369,740.

My invention relates to improvements in a sub-pulverizer disk for sub-pulverizing and aerating the soil in a grove and orchard without seriously injuring the roots of the trees. The frequent stamping over the ground in a grove and orchard with teams, tractors and sprayers, eventually makes the ground very hard packed, so it cannot retain the proper moisture, and the feeders of the trees cannot propagate in such hard packed soil.

There is not at present any invention or implement on the market by which the soil can be pulverized and aerated down in between the roots of the trees without seriously injuring and cutting the roots.

The objects of my improvement are; first, to provide a device with rounded oblong and pointed teeth, fastened on a disk; second, that these teeth are rounded oblong i. e., with no square or sharp corners, that would severely cut and tear the roots of the trees; third, that the teeth are so tapered that they will not pick up much, if any, rubbish so as to clog up, and also are so shaped and constructed that they will resist a severe strain without bending or breaking.

I attain these objects by the device illustrated in the accompanying drawings, in which—

Figure 1 is a face view of the complete disk; Fig. 2 is a central sectional view on line 2—2, Fig. 1; Fig. 3 is a face view of one of the teeth 2; Fig. 4 is a central section of teeth 2, on line 3—3, Fig. 3; Fig. 5 is a face view of disk 1, without the teeth; Fig. 6 is a central sectional view of disk 1, on line of 2—2, Fig. 1, without the teeth; Fig. 7 is a transverse section through one of teeth 2, on line of 2—2, Fig. 3.

Similar numerals refer to similar parts throughout the different views.

Specifically describing the invention: The disk 1, is constructed in suitable dimensions and thickness, either flat or concave, preferably concave, with holes for rivets so a plural number of teeth are used, spaced equal distances apart and riveted on to disk 1, with two suitable size rivets 3, Fig. 2, in each tooth. These teeth can easily be exchanged by cutting and removing the rivets. These teeth are constructed, rounded oblong on transverse section, Fig. 7, so as to have no sharp corners or edges to cut and injure the roots of the trees, and are tapered to a sharp point, Fig. 3—4, so as to penetrate deeply into the soil between the roots of the trees, yet shaped so as not to pick up any great amount of rubbish. The length of teeth 2, are made so as to leave room in the centre of disk 1, for the spool 5, Fig. 2, of an ordinary disk harrow. An offset 4, Fig. 4, is made in teeth 2, so as to fit the face of disk 1; A square hole 7, is made in disk 1, to fit the square axle 6, Fig. 2, of an ordinary disk harrow and to keep it from turning on the axle.

By virtue of this construction any plural number of these disks can readily be exchanged for the ordinary disks on any ordinary disk harrow frame.

I am aware that prior to my invention rotating pulverizers and disks have been made, I therefore do not claim broadly to be the inventor of a rotating pulverizer.

I claim:

The combination of a rotary sub-pulverizer disk, with a plural number of teeth that are oblong rounded on transverse section, i. e., with no square or sharp corners or edges that would severely cut or tear the roots of the trees.

In testimony whereof I affix my signature.

SWAN O. BURG.